Nov. 25, 1924.
E. H. BRUNE
1,516,952
PROCESS FOR THE DISPOSAL OF GARBAGE
Filed May 24, 1923
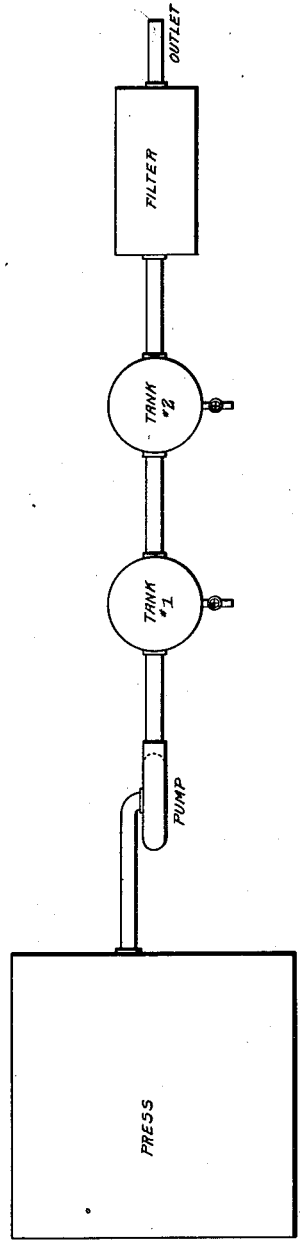

Patented Nov. 25, 1924.

1,516,952

UNITED STATES PATENT OFFICE.

EDWARD H. BRUNE, OF ST. LOUIS, MISSOURI.

PROCESS FOR THE DISPOSAL OF GARBAGE.

Application filed May 24, 1923. Serial No. 641,268.

*To all whom it may concern:*

Be it known that I, EDWARD H. BRUNE, a citizen of the United States, residing at St. Louis, in the State of Missouri, have invented certain new and useful Improvements in a Process for the Disposal of Garbage, of which the following is a specification.

The present invention relates to a process for the disposal of garbage.

An object of the invention is to treat the so-called green city garbage in a manner which will salvage all solids or semi-solids for use as hog and poultry feed, fertilizer, etc.

Another object of the invention is to provide a process which selectively delivers the different species of the reduced garbage periodically during treatment of the latter so that each species is segregated from the mass immediately upon completion of its cycle of treatment.

A further object of the invention is to provide a simple process employing durable and effective apparatus unaffected by the admixture of glass or like materials through the garbage.

In the drawings, the figure is a diagrammatical view of apparatus employed for treatment of the garbage in accordance with the teaching of the present invention.

It is well known in the art to provide garbage disposal processes and it is also well known in the art to treat waste products especially the refuse from packing houses, etc., in a manner which will render the waste suitable for hog and poultry feed. The present invention makes it possible to treat the green city garbage in a manner which provides a non-injurious food for hogs and poultry at a very low cost.

The drawing illustrates diagrammatically the apparatus employed consisting especially of a press, pump, tanks and filter with proper communication therebetween. The green garbage is deposited in the press where it is crushed to extract the liquids and ground into a pulp. The pulp is immediately taken from the press and may be used as ordinary tankage for hog and poultry feed or may be used as a fertilizer. The liquid extract from the garbage passes from the press into the pump and is forced by the pump into the tank 1 which consists of a receiving or storage tank. The liquid from the tank 1 is permitted to pass therefrom into the tank 2 known as the processing tank. The volume in which the liquid passes from the tank 1 to the tank 2 may be controlled by a valve or other suitable means and the amount of liquid passing from tank 1 into tank 2 is predetermined so that only a workable amount of liquid is in the processing tank at all times. The process tank is equipped with suitable heating means preferably a steam coil which will heat the liquid to sterilize the latter, cause the albumenoids to coagulate and also to segregate the oils and fats in a definite strata on the surface of the liquid. The oils and fats may be skimmed off or drawn off through suitable outlet openings and the albumenoids also withdrawn. The resultant liquid body passes from the processing tank 2 into the filter where all particles suspended in the liquid are retained and the liquid permitted to pass through the outlet from the filter.

In view of the above it is apparent that the principal solids contained in the garbage are salvaged after treatment in the press. The albumenoids, oils and fats, all useful products for animals, are salvaged by removal from the processing tank while the particles remaining in the liquid are salvaged from the filter. In this way, all usable food elements are retained so that the garbage is salvaged practically in its entirety. By withdrawing certain by-products of the garbage at different intervals during the process, the expense and labor of handling the garbage is reduced to a minimum. Moreover, the liquid in the processing tank is rendered sterile under the action of the heat permitting feeding of the products, withdrawn from the processing tank, without possibility of infecting the animals or poultry consuming same.

It is understood that the process for treating the garbage may be varied and substantially the same results obtained. The present process is defined merely to illustrate the principle involved in the invention in order to show one method which may be followed to utilize city garbage practically in its entirety and reduce the same to usable form both as a food product and fertilizer.

What is claimed is:—

A garbage disposal process consisting of pressing garbage to a pulp for expressing liquids therefrom, then pumping the expresed liquid into a storage tank after which the liquid is withdrawn in a predetermined volume from the storage tank and transferred to a processing tank, then subjecting the liquid in the processing tank to the action of heat to segregate the oils and fats in definite strata on the surface of the liquid and permitting the solid particles to gravitate to the bottom of the processing tank, and finally removing the oils, fats and solid particles from the processing tank after which the liquid residue is passed through a filter for salvaging particles suspended in the liquid.

EDWARD H. BRUNE.